United States Patent
Bhuyan et al.

(10) Patent No.: US 8,984,615 B2
(45) Date of Patent: Mar. 17, 2015

(54) WEB TO IMS REGISTRATION AND AUTHENTICATION FOR AN UNMANAGED IP CLIENT DEVICE

(75) Inventors: Krishna Bhuyan, Redmond, WA (US); Hong Thi Nguyen, Atlanta, GA (US)

(73) Assignee: AT&T Mobility II, LLC, Atlanta, GA (US)

( * ) Notice: Subject to any disclaimer, the term of this patent is extended or adjusted under 35 U.S.C. 154(b) by 1098 days.

(21) Appl. No.: 12/648,975

(22) Filed: Dec. 29, 2009

(65) Prior Publication Data
US 2010/0263032 A1    Oct. 14, 2010

Related U.S. Application Data

(60) Provisional application No. 61/167,657, filed on Apr. 8, 2009.

(51) Int. Cl.
G06F 21/00    (2013.01)
H04L 29/06    (2006.01)

(52) U.S. Cl.
CPC ............ *H04L 63/168* (2013.01); *H04L 63/061* (2013.01); *H04L 63/08* (2013.01); *H04L 63/0884* (2013.01)

USPC ............................................. 726/12; 719/311

(58) Field of Classification Search
None
See application file for complete search history.

(56) References Cited

U.S. PATENT DOCUMENTS

| | | | |
|---|---|---|---|
| 2008/0168540 A1* | 7/2008 | Agarwal et al. | 726/5 |
| 2009/0193469 A1* | 7/2009 | Igarashi | 725/56 |
| 2010/0217837 A1* | 8/2010 | Ansari et al. | 709/218 |
| 2011/0200022 A1* | 8/2011 | Annamalai | 370/338 |

* cited by examiner

*Primary Examiner* — Kambiz Zand
*Assistant Examiner* — Leynna Truvan
(74) *Attorney, Agent, or Firm* — Gardner Groff Greenwald & Villanueva, P.C.

(57) ABSTRACT

Systems and methods are for registering and authenticating an unmanaged IP device to an IP multimedia subsystem (IMS). An exemplary method includes implementing a system from which an unmanaged IP device retrieves IMS credentials needed to register and authenticate to the IMS. The system is remote to the unmanaged IP device and is accessible to the unmanaged IP device through an IP access network. The method further includes permitting the unmanaged IP device to register and authenticate to the IMS with the IMS credentials received from the system.

15 Claims, 3 Drawing Sheets

WEB TO IMS REGISTRATION AND AUTHENTICATION FOR AN UNMANAGED IP CLIENT DEVICE

RELATED APPLICATION

This application claims priority to U.S. Provisional Patent Application No. 61/167,657, filed Apr. 8, 2009, the entirety of which is hereby incorporated by reference.

TECHNICAL FIELD

The present disclosure relates generally to Internet Protocol (IP) Multimedia Subsystem (IMS) registration and authentication processes and, more particularly, to IMS registration and authentication processes for an unmanaged IP client device.

BACKGROUND

Internet Protocol (IP) Multimedia Subsystem (IMS) is a general-purpose, open industry standard for voice and multimedia communications over IP networks. It is a core network technology that serves as a low-level foundation for services such as, for example, voice over IP (VoIP), push-to-talk (PTT), video calling, video share, gaming, and other multimedia services.

IMS services enable person-to-person and person-to-content communications in a variety of modes, including voice, text, pictures, video, or any combination thereof. Carriers see benefit in IMS due to increased flexibility to offer new services and lower costs to launch and maintain these services.

The goal of IMS is the convergence of all voice and multimedia communications from both mobile and fixed networks to a single, flexible, packet-based communications system based upon IP technologies. IMS is based primarily upon the session initiation protocol (SIP). IMS allows for easy integration with existing and legacy network systems.

IMS requires security mechanisms for access security and network security. Access security includes authentication of users to the network and protection of network traffic between an IMS terminal (e.g., an IMS-compatible cellular telephone) and the network. Network security includes protection of traffic between network nodes in networks operated by the same or different carriers.

With regard to access security, users are required to be authenticated and authorized prior to accessing any IMS service. After a user is authorized, SIP traffic between their IMS terminal and the IMS is protected by using two IP security (IPsec) security associations. SIP REGISTER messages are used to authenticate and authorize the user and to establish the IPsec security associations. A serving call session control function (S-CSCF) of the IMS retrieves an authentication vector from a home subscriber server (HSS) to authenticate and authorize the user. The proxy-CSCF (P-CSCF) establishes the IPsec security associations with the IMS terminal.

Authentication and authorization in the IMS rely on security mechanisms stored on a circuit card that is inserted into the IMS terminal or integrated into the IMS terminal. In some networks, such as those governed by 3$^{rd}$ Generation Partnership Project (3GPP) specifications, the circuit card is a universal integrated circuit card (UICC). The UICC includes one or more applications that aid in allowing a terminal to communicate with various networks. For example, an IMS application called an IP-Multimedia Services Identity Module (ISIM) allows an IMS terminal to communicate with an IMS. Likewise, a subscriber identity module (SIM) allows a terminal to communicate with a global system for mobile communications (GSM) network, and a universal SIM (USIM) allows a terminal to communicate with a universal mobile telecommunications system (UMTS) network, for example.

In ISIM implementations, the ISIM includes a secret key that is shared with the HSS. The HSS is configured to store the secret key for each ISIM in the network. The S-CSCF uses the diameter protocol to obtain an authentication vector from the HSS with which to challenge the IMS terminal. The authentication vector includes a challenge and an expected challenge response, among others. If the IMS terminal issues a challenge response that is not the expected challenge response, the S-CSCF considers the authentication to have failed.

If the user does not have an ISIM, then the USIM may be employed because the security algorithms held on the USIM are the same as those held on the ISIM. An IMPI, however, will have to be resolved from the user's international mobile subscriber identity (IMSI) to initiate a registration and authentication process.

SUMMARY

According to one aspect of the present disclosure, a provisioning process assists a pre-authenticated web or computer-based client device in an IMS authentication and registration process that includes, providing IMS credentials to the client device and calculating the expected response to the authentication challenge received from the IMS session manager (e.g., S-CSCF) for the client device.

According to another aspect, a user enters a username and password to pre-authenticate the client device via a web security gateway. Upon authentication, the client requests assistance from a network proxy (IMS-web security gateway) in obtaining the proper credentials to register with the IMS network. The IMS credentials (e.g., an IMPI and an IMPU) and a shared secret key are provisioned by a provisioning mediation server into the IMS-web security gateway at service subscription time. During registration attempts, the client device receives the IMS credentials and a security challenge response (generated by the IMS-web security gateway) from the IMS-web security gateway via the web security gateway. These credentials are used by the client device to register and authenticate with the IMS to access IMS services.

According to another aspect of the present disclosure, an IP device requests IMS credentials from a web security gateway, the web security gateway retrieves the requested IMS credentials from an IMS-web security gateway, and the web security gateway forwards the requested IMS credentials to the IP device. The IP device generates a registration request including the IMS credentials received from the web security gateway and sends the registration request to a call session control function (CSCF) of the IMS. The CSCF retrieves a security challenge from a home subscriber server (HSS) using the IMS credentials received in the registration request and sends the security challenge to the IP device. The IP device requests a security challenge response from the web security gateway. The web security gateway retrieves the security challenge response from the IMS-web security gateway and forwards the security challenge response to the IP device. The IP device generates an authentication request including the security challenge response received from the web security gateway and sends the authentication request to the CSCF. The CSCF authenticates the IP device to access IMS services provided through the IMS.

In some embodiments, the IMS credentials include an IMS public user identity and/or an IMS private user identity. In some embodiments, the registration request is a first session initiation protocol (SIP) REGISTER request that includes the IMS credentials. In some embodiments, the authentication request is a second SIP REGISTER request that includes the security challenge response.

The IMS-web security gateway, in some embodiments, generates the security challenge response using a secret key received during an IMS service provisioning process and the security challenge received from the IP device. The IMS-web security gateway sends the security challenge response to the web security gateway upon request from the web security gateway.

The web security gateway, in some embodiments, receives pre-authentication credentials from the IP device. The pre-authentication credentials are used by the web security gateway to pre-authenticate the IP device to retrieve the IMS credentials and the security challenge response from the web security gateway. In some embodiments, the pre-authentication credentials include a username and password and the web security gateway compares the username and password to a record associated with the IP device stored in an authentication database of the web security gateway to determine whether the IP device is pre-authenticated to receive the IMS credentials.

According to another aspect of the present disclosure, a method includes implementing a system from which an unmanaged IP device retrieves IMS credentials and a response to a security challenge needed to register and authenticate the unmanaged IP device to the IMS. The system is located remote to the unmanaged IP device and is accessible to the unmanaged IP device through an IP access network. The method further includes permitting the unmanaged IP device to register and authenticate to the IMS with the IMS credentials received from the system. The system receives the IMS credentials from a provisioning mediation server during a provisioning process. In some embodiments, the IMS credentials include an IMS private user identity and/or an IMS public user identity. The system also receives a secret key from the provisioning mediation server during the provisioning process. The system uses the secret key in combination with a security challenge from the HSS during authentication to generate a security challenge response.

In some embodiments, the method further includes permitting the IP device to generate a registration request including the IMS private user identity and/or the IMS public user identity and send the registration request to the IMS and permitting the IP device to generate an authentication request including the security challenge response and send the authentication request to the IMS in response to the security challenge to complete registration and authentication of the IP device to the IMS.

According to another aspect of the present disclosure, a system for registering and authenticating an unmanaged IP device to an IP multimedia subsystem (IMS) includes a gateway in communication with the IP device and a call session control function (CSCF) in communication with the IP device. The IP device is configured to generate and send a request for an IMS user identity to the gateway, receive the requested IMS user identity from the gateway, generate and send a first session initiation protocol (SIP) REGISTER message including the IMS user identity to the CSCF, and receive a SIP 401 unauthorized response including the security challenge from the CSCF. The IP device is further configured to generate and send a request for a security challenge response to the gateway, receive the requested security challenge response from the gateway, generate and send a second SIP REGISTER message including the security challenge response to the CSCF, and receive a SIP 200 OK message from the CSCF indicating successful registration and authentication of the IP device.

In some embodiments, the gateway is configured to receive the request for the IMS user identity from the IP device, retrieve the requested IMS user identity, send the requested IMS user identity to the IP device, receive the request for the security challenge response from the IP device, retrieve the requested security challenge response, and send the requested security challenge response to the IP device.

In some embodiments, the system further includes an IMS-web security gateway and the gateway is a web security gateway that retrieves the requested IMS user identity and the requested security challenge response from the IMS-web security gateway. In some embodiments, the IMS-web security gateway is provisioning by a provisioning mediation server with the IMS user identity and a secret key. The secret key is used by the IMS-web security gateway to generate the security challenge response.

In some embodiments, the IMS-web security gateway is configured to perform a provisioning process including the steps of receiving an IMS provisioning request from the IP device via the web security gateway, notifying a provisioning mediation server to provision the IP device for IMS service, receiving the IMS user identity and a secret key from the provisioning mediation server, and storing the IMS user identity and the secret key for use in a future IMS registration and authentication attempt.

In some embodiments, the gateway retrieves the requested IMS user identity and the requested security challenge response from a database within the gateway.

In some embodiments, the IP device is a computer, a handheld computing device, a gaming device, a global positioning system (GPS) unit, or a mobile device that is not configured with an IP-Multimedia Services Identity Module (ISIM) or Universal Subscriber Identity Module (USIM) for registering and authenticating to the IMS.

DETAILED DESCRIPTION

Figure 1:
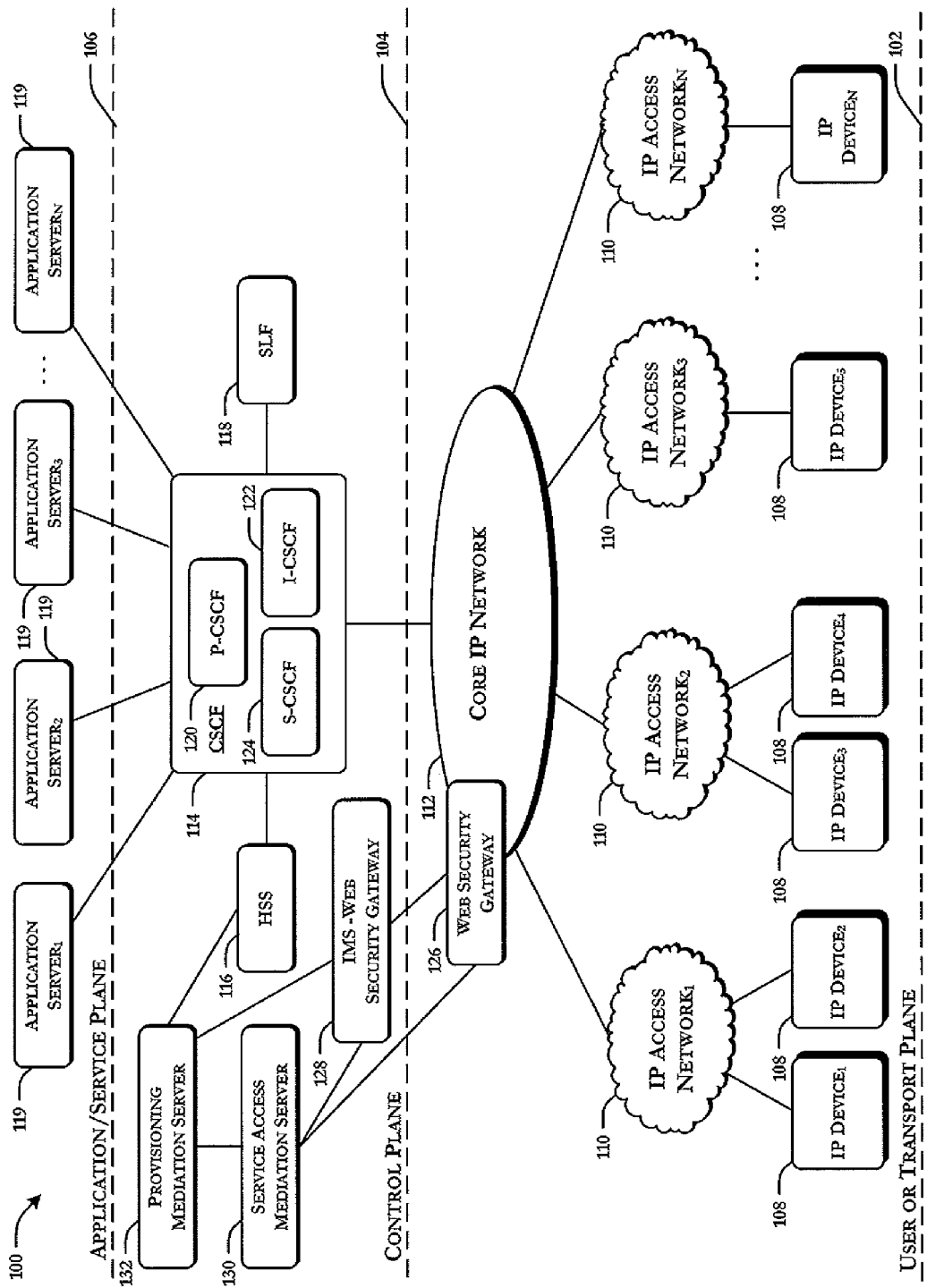
FIG. 1 schematically illustrates an exemplary network architecture in which various aspects of the present disclosure can be implemented.

As required, detailed embodiments of the present disclosure are provided herein. The disclosed embodiments are merely examples that may be embodied in various and alternative forms, and combinations thereof. As used herein, for example, exemplary, and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the devices and methods of the present disclosure. Therefore, specific structural and functional details disclosed herein are not to be interpreted as limiting, but merely as a basis for the claims and as a representative basis for teaching one skilled in the art to variously employ the present disclosure.

The systems and methods of the present disclosure may be implemented in wireless networks that use exemplary telecommunications standards, such as Global System for Mobile communications (GSM) and a Universal Mobile Telecommunications System (UMTS). It should be understood, however, that the systems and methods may be implemented in wireless networks that use any existing or yet to be developed telecommunications technology. Some examples of other suitable telecommunications technologies include, but are not limited to, networks utilizing Time Division Multiple Access (TDMA), Frequency Division Multiple Access (FDMA), Wideband Code Division Multiple Access (VVCDMA), Orthogonal Frequency Division Multiplexing (OFDM), Long Term Evolution (LTE), and various other 2G, 2.5G, 3G, 4G, and beyond technologies. Examples of suitable data bearers include, but are not limited to, General Packet Radio Service (GPRS), Enhanced Data rates for Global Evolution (EDGE), the High-Speed Packet Access (HSPA) protocol family, such as, High-Speed Downlink Packet Access (HSDPA), Enhanced Uplink (EUL) or otherwise termed High-Speed Uplink Packet Access (HSUPA), Evolved HSPA (HSPA+), and various other current and future data bearers.

While the processes or methods described herein may, at times, be described in a general context of computer-executable instructions, the methods, procedures, and processes of the present disclosure can also be implemented in combination with other program modules and/or as a combination of hardware and software. The term application, or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, handheld computing devices, mobile devices, microprocessor-based, programmable consumer electronics, network elements, gateways, network functions, devices, combinations thereof, and the like.

FIG. 1 illustrates an exemplary network architecture 100 in which various aspects of the present disclosure can be implemented. The illustrated network elements communicate with each other using one or more protocols such as session initiation protocol (SIP), hypertext transfer protocol (HTTP), HTTP secure (HTTPS), diameter, and/or the like. It should be understood that FIG. 1 and the following description are intended to provide a general understanding of a suitable environment in which the various aspects of some embodiments of the present disclosure can be implemented. It will be appreciated that some of the illustrated network elements are arranged in accordance with various standard specifications, such as IMS and other telecommunications standards developed by the 3$^{rd}$ Generation Partnership Project (3GPP), 3GPP2, and Internet Engineering Task Force (IETF) organizations. The logical arrangement of the illustrated network elements is merely one example of a possible arrangement, and is not meant to limit, in any way, other possible arrangements of the illustrated network elements. Particularly, several network elements are introduced below that are illustrated as communicating with known IMS core and access network elements. These network elements are arranged as illustrated for clarity and to aid in explanation of various embodiments of the present disclosure and are not intended to limit the scope of the systems and methods described herein or the scope of the appended claims.

In the illustrated embodiment, the network architecture 100 is logically arranged into three planes or layers, including a user/transport plane 102, a control plane 104, and an application/service plane 106. Generally, the illustrated user/transport plane 102 has a plurality of IP devices 108 and a plurality of IP access networks 110 by which the IP devices 108 are capable of accessing a core IP network 112. The core IP network 112 provides IP backbone network connectivity between the IP access networks 110 and the control plane 104 elements. The control plane 104 elements include IMS core network elements, such as a call session control function (CSCF) 114, a home subscriber server (HSS) 116, and a subscriber location function (SLF) 118.

The user/transport plane 102 is responsible for initiating and terminating web sessions and SIP sessions, and converting data transmitted between analog/digital formats and an IP packet format. The IP devices 108 connect to the core IP network 112 via a variety of access technologies provided by the IP access networks 110.

The IP access networks 110, in some embodiments, include one or more wireless access networks, such as GPRS, EDGE, HSPA, HSDPA, HSUPA, evolved HSPA, EVDO, LTE, IEEE 802.11x (WIFI), IEEE 802.16x (WIMAX), satellite-based networks, and the like. The IP access networks 110 may alternatively or additionally include landline-based access networks including, but not limited to, networks utilizing technologies such as dial-up, digital subscriber line (DSL), cable, T-line, fiber optics, and the like.

Generally, the IP devices 108 do not include the IMS credentials necessary to conduct registration and authentication processes to gain authorization for access to various services provided by the application servers 119 in the application/service plane 106. That is, the IP devices 108 are not IMS terminals, per se, as established by the IMS standard specifications. For example, the IP devices 108 lack required IMS credentials, such as the public and private user identities (IMPI, IMPU) and a shared secret key needed to register and authenticate with the S-CSCF 124 of the IMS core network via a traditional IMS registration and authentication process, such as described in the Background section, above. The IP devices 108, although not configured as an IMS terminal or IMS-compatible device, such as a cellular telephone configured with an ISIM or USIM, are capable of registering and authenticating with the IMS core network using the systems and processes disclosed herein, without modification to the IP device 108. Thusly, the IP devices 108 are referred to herein, at times, as IP devices, IP client devices, or unmanaged IP client devices.

Exemplary IP devices 108 include, but are not limited to, computers such as personal computers, portable computers (e.g., laptops, notebooks, and netbooks), and servers, handheld computing devices such as personal digital assistants (PDAs), gaming devices, and global positioning system (GPS) units, mobile devices such as cellular telephones, and the like lacking IMS credentials.

The core IP network 112, in some embodiments, uses multiprotocol label switching (MPLS) to route packets in the core IP network 112. MPLS is standardized by the IETF. MPLS is used to ensure that all packets in a particular flow take the same route over the core IP network 112. MPLS delivers the quality of service (QoS) required to support real-time voice and video as well as service level agreements (SLAs) that guarantee the bandwidth needed to support these services. An MPLS router (not shown) operating at the edge of the core IP network 112 may attach labels or tags containing forwarding information to IP packets. These label edge routers (LERs) perform complex packet analysis and classification tasks before IP packets enter the core IP network 112. Other routers, known as label switch routers (LSRs) (not shown), which may operate within the core IP network 112, examine the label and forward the packet according to the forwarding information attached by the MPLS router without having to access a lookup table and compute the forwarding path each time. Edge routers at a receiving end of the core IP network 112 remove the labels.

The core IP network 112 is in communication with the IMS core network via the CSCF 114. The CSCF 114 includes a proxy CSCF (P-CSCF) 120, an interrogating CSCF (I-CSCF) 122, and a serving CSCF (S-CSCF) 124. In some embodiments, the P-CSCF 120 and the I-CSCF 122 are combined as a combination I/P-CSCF. Additionally, in some embodiments, the CSCF 114 includes multiple P-CSCFs, I-CSCFs, and/or S-CSCFs.

Generally, the P-CSCF 120 functions as the entry point into the IMS core network. The P-CSCF 120 is responsible for routing incoming SIP messages to the I-CSCF 122 and for facilitating policy control with a policy and charging rules function (not shown). The P-CSCF 120 is also responsible for setting up IPSec security associations for IMS terminals to ensure access to the IMS core network.

The I-CSCF 122 functions as a proxy between the P-CSCF 120 as the IMS core network entry point and the S-CSCF 124 as the control point for the IMS core network. The I-CSCF 122 receives SIP messages from the P-CSCF 120 and communicates with the HSS 116 to determine which S-CSCF (e.g., the illustrated S-CSCF 124) is associated with a requesting terminal. The I-CSCF 122 forwards SIP messages to the appropriate S-CSCF.

The S-CSCF 124 interfaces with the application servers 119 in the application/service plane 106. Upon receiving a SIP REGISTER request from the I-CSCF 122, the S-CSCF 124 queries the HSS 116 via diameter protocol to register an IMS terminal or the IP device 108 to the S-CSCF 124. As part of a typical registration process, the S-CSCF 124 uses challenge credentials obtained from the HSS 116 to issue a SIP 401 (unauthorized) message to challenge the IMS terminal for authentication purposes. The S-CSCF 124 is also responsible for routing all SIP messages to the application servers 119. To do this, the S-CSCF 124 uses information obtained from the HSS 116 in the form of Initial Filter Criteria (IFC) that acts as triggers against inbound session establishment requests. The IFC include rules that define how and where SIP messages should be routed to the various application servers that reside in the application/service plane.

The CSCF 114 is in communication with the HSS 116, which stores a unique service profile for each IMS user. The HSS 116 supports home location register (HLR) functions, access functions, authentication and authorization functions, and accounting functions, and stores subscriber data for the IMS core network. The CSCF 114 communicates with the HSS 116 using the diameter protocol. The HSS 116 is described in greater detail herein with respect to its functions in the registration and authentication process described with reference to FIG. 2 and the IMS service provisioning process described with reference to FIG. 3.

The CSCF 114 is also in communication with the SLF 118. The SLF 118 is generally implemented as a database. The SLF 118 is an entity within the IMS core network that provides information about the HSS (e.g., the HSS 116 or another HSS) which is configured to store the unique service profile of a particular user. If there are more than one HSS in the IMS network, the I-CSCF 122 and S-CSCF 124 will communicate with the SLF 118 to find the HSS that stores a particular user's service profile. The CSCF 114 communicates with the SLF 118 using the diameter protocol.

The illustrated network architecture 100 also includes a web security gateway 126 that is in communication with an IMS-web security gateway 128. In some embodiments, the web security gateway 126 and the IMS-web security gateway 128 are combined into a single network element configured to perform the functions of each gateway. The web security gateway 126 is configured to pre-authenticate the IP device 108 to receive IMS credentials, including a user's IMPI and IMPU, from the IMS-web security gateway 128 as an initial step in IMS registration for the IP device 108. In some embodiments the web security gateway 126 includes an authentication database storing usernames and passwords for a plurality of IP devices 108 and associated users. When the web security gateway 126 receives a username and password from a user as part of the pre-authentication process, the web security gateway 126 compares the received username and password with the user's record in the authentication database to determine whether the requesting device should be authorized to receive IMS credentials.

In some embodiments, the web security gateway 126 is accessible through a web application accessible via the Internet, an intranet or other data network, or via a native application stored on the IP device 108. The web security gateway 126, in some embodiments, use HTTP or HTTP in combination with SSL/TLS protocols in accordance with HTTPS standards to provide encryption for secure transmission of data between the IP devices 108 and the web security gateway 126. Alternatively, in some embodiments, the web security gateway 126 and the IP devices 108 communicate using other secure web protocols, such as secure HTTP (S-HTTP) or the like. Successful pre-authentication of an IP device 108 triggers the web security gateway 126 to notify the IP device 108 of successful authentication, at which point the IP device 108 can request the IMS credentials.

The web security gateway 126 is further configured to receive a request for IMS credentials from the IP device 108 and forward the request to the IMS-web security gateway 128 to retrieve the credentials. In some embodiments, the communications between the web security gateway 126 and the IMS-web security gateway 128 are also conducted using HTTP, HTTPS, S-HTTP, or like web protocols.

An IMS provisioning process for the IP devices 108 is disclosed below with reference to FIG. 3. This process provides the IMS credentials and a secret key to the IMS-web security gateway 128 for use in responding to requests from the IP device 108 for IMS credentials and a security challenge response, which is generated by the IMS-web security gateway 128 using a security challenge and the secret key. Briefly, the provisioning mediation server 132 provisions the HSS 116 with IMS credentials and the secret key, and stores this information such that subsequent requests by the IP device 108 for this information can be fulfilled by the IMS-web security gateway 128.

The IMS-web security gateway 128 and the HSS 116 are each configured to store and maintain a counter called a sequence number, which is used to maintain synchronization between the HSS 116 and the IMS-web security gateway 128 when handling authentication processes. The sequence number for the IMS-web security gateway 128 is also referred to as the $SQN_{MS}$ and the sequence number for the HSS 116 is also referred to as the $SQN_{HSS}$. The $SQN_{MS}$ and the $SQN_{HSS}$, in some embodiments, are each set to an initial value of zero to ensure synchronization between the HSS 116 and the IMS-web security gateway 128. In some embodiments, the provisioning mediation server 132 is configured to provide the $SQN_{HSS}$ to the HSS 116 and the $SQN_{MS}$ to the IMS-web security gateway 128, respectively, during the provisioning process. In other embodiments, the HSS 116 and the IMS-web security gateway 128 are configured to initialize the sequence numbers upon being provisioned with the IMS credentials and the secret key and maintain the sequence numbers when handling authentication processes described herein.

After a user is subscribed to IMS service and the IMS-web security gateway 128 is provisioned with the IMS credentials and the secret key for that user, the IMS-web security gateway 128 can provide the credentials to the user's IP device 108 upon request. With the IMS credentials, the user's IP device 108 can initiate a standard SIP registration process to register with the IMS core network. For example, the IP device 108 now has the IMPI and IMPU and can generate a first SIP REGISTER message including these credentials to attempt registration with the S-CSCF 124. The first SIP REGISTER message is also referred to herein as the registration request message.

As will be discussed in more detail below, although the IP device 108 is now capable of initiating a SIP registration process, it does not include the necessary security challenge response(s) required to authenticate to the S-CSCF 124 as a typical IMS terminal would, such as by calculating the security challenge response using a random number (security challenge) received from the S-CSCF 124 and a secret key stored in an ISIM or USIM. Instead, in accordance with the present disclosure, the IP device 108 obtains a security challenge response from the web security gateway 126. Similar to the process outlined above for obtaining the IMPI and IMPU from the IMS-web security gateway 128, the web security gateway 126 receives a request for the security challenge response from the IP device 108, forwards it to the IMS-web security gateway 128, receives the security challenge response from the IMS-web security gateway 128, and forwards it to the IP device 108. The IP device 108 can now send a second SIP REGISTER message including the security challenge response to the S-CSCF 124. The second SIP REGISTER message is also referred to herein as the authentication request message.

Assuming the security challenge response received from the IP device 108 matches the expected response known to the S-CSCF 124, the S-CSCF 124 will respond with a SIP 200 OK message acknowledging successful registration and authentication of the IP device 108 to the S-CSCF 124, thereby providing the IP device 108 access to IMS services offered by the application servers 119.

As also illustrated in FIG. 1, the web security gateway 126 is in communication with a service access mediation server 130, which facilitates provisioning of IMS service for the IP devices 108. In some embodiments, the web security gateway 126 receives an IMS service provisioning request directly from an IP device 108, from a point-of-sale (PoS) system (not shown), from a website, or from another source and forwards the provisioning request to the service access mediation server 130, which communicates with a provisioning mediation server 132 to provision IMS service for the requesting IP device 108.

The provisioning mediation server 132 communicates with the HSS 116 upon receiving a provisioning request from the service access mediation server 130 to provision the HSS 116 with IMS credentials (e.g., IMPI, IMPU) and a secret key. The provisioning mediation server 132 also provisions the IMS-web security gateway 128 with this information. This takes place during the provisioning process described below with reference to FIG. 3.

Figure 2:
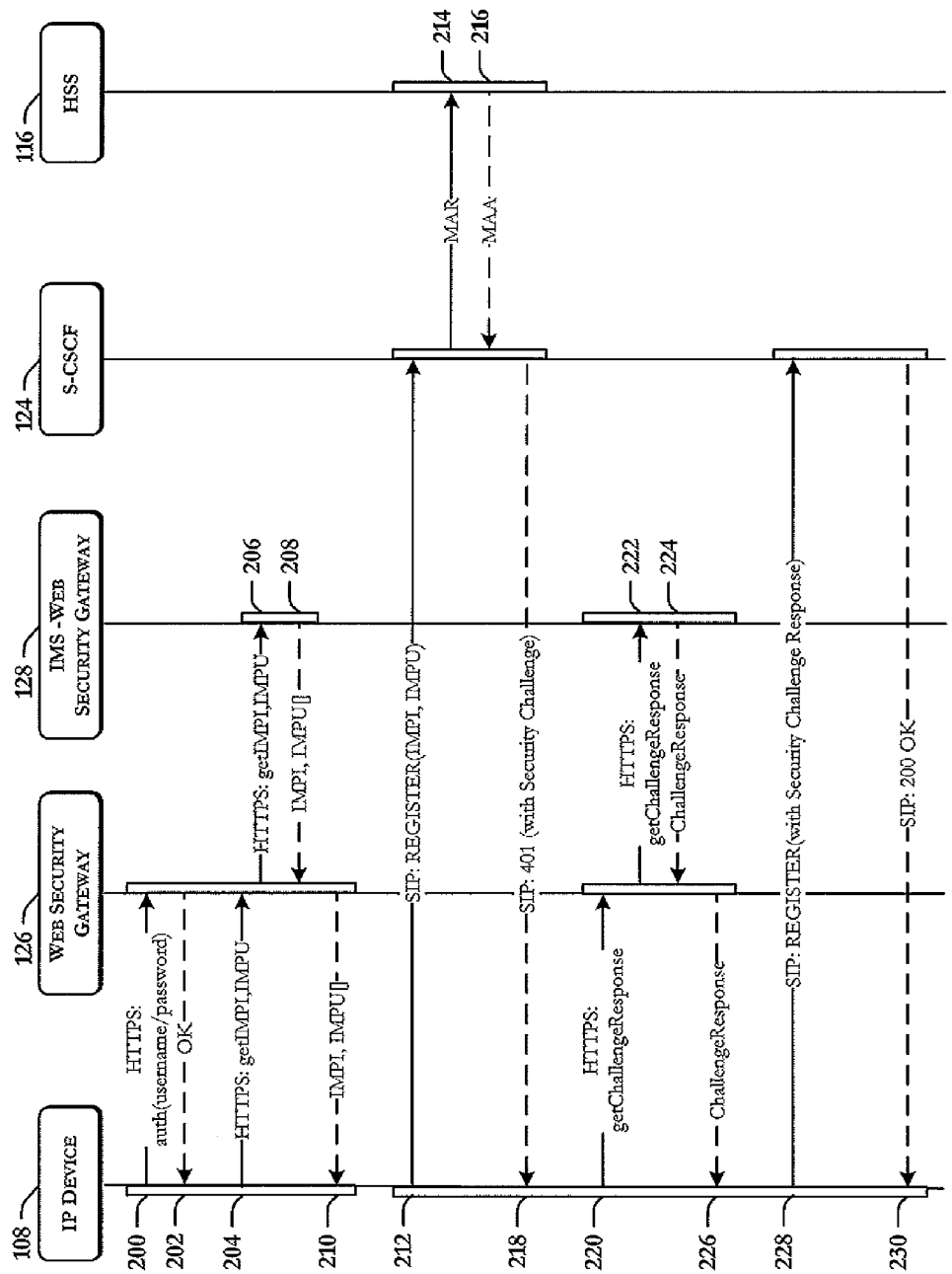
FIG. 2 schematically illustrates a message flow diagram of an exemplary IMS registration and authentication process for an unmanaged IP client device.

Referring now to FIG. 2, a message flow diagram depicting an exemplary IMS registration and authentication process for an unmanaged IP client device 108 is illustrated. The message flow diagram illustrates messages exchanged between the IP device 108, the web security gateway 126, the IMS-web security gateway 128, the S-CSCF 124, and the HSS 116.

The exemplary IMS registration and authentication process begins at step 200 when pre-authentication credentials, including a username and a password, are sent to the web security gateway 126 using a web protocol, such as HTTP, HTTPS, or S-HTTPS. The web security gateway 126 receives the pre-authentication credentials from the IP device 108 and queries the authentication database for a matching user record. If the pre-authentication credentials do not match any stored record, the web security gateway 126 may prompt the user to reenter the credentials, prevent further credential entries until a predetermined time period has elapsed, prompt the user to call a customer service number or visit a customer service website for further assistance, or the like. Else, if the authentication credentials match a stored record, the web security gateway 126 notifies the IP device 108 of successful authentication. In the illustrated example, the web security gateway 126 sends an OK message to the IP device 108 to indicate successful authentication of the IP device 108 to the web security gateway 126, thereby completing a pre-authentication process and authorizing the IP device 108 to request IMS credentials from the web security gateway 126.

At step 204, successful pre-authentication triggers the IP device 108 to request the user's IMPU and/or IMPI from the web security gateway 126. The web security gateway 126 receives the request, determines that the IP device 108 is already pre-authenticated based upon the authentication credentials previously received from the IP device 108, and authorizes the request for the user's IMPU and/or IMPI. The web security gateway 126 then forwards the request to the IMS-web security gateway 128 at step 206. At step 208, per the request, the IMS-web security gateway 128 returns the user's IMPI and IMPU to the web security gateway 126. At step 210, the web security gateway 126 forwards the user's IMPI and/or IMPU to the IP device 108.

At step 212, the IP device 108 initiates an unauthenticated IMS registration process by generating a first SIP REGISTER request (registration request), including the IMPI and/or IMPU received from the IMS-web security function 128. The IP device 108 sends the first SIP REGISTER request to the 5-CSCF 124.

At step 214, the first SIP REGISTER request triggers the S-CSCF 124 to send a diameter protocol Multimedia-Auth-Request (MAR) to the HSS 116 to retrieve an authentication vector. In the illustrated embodiment, the IMS-web security gateway 128 has been provisioned with a secret key that is shared with the HSS 116. The secret key is initially provided to the IMS-web security gateway 128 during a provisioning process described below with reference to FIG. 3. The HSS 116 generates an authentication vector based upon the shared secret key. The authentication vector includes a random challenge (RAND), a network authentication token (AUTN), an expected response (XRES) to the RAND, a session key for integrity check (IK), and a session key for encryption (CK).

At step 216, the HSS 116 returns the requested authentication vector associated with the IMPI/IMPU, generates a diameter protocol Multimedia-Auth-Answer (MAA) that includes the authentication vector requested in the MAR, and sends the MM to the S-CSCF 124.

The S-CSCF 124 receives the authentication vector in the MAA and is now able to respond to the first SIP REGISTER request with a SIP 401 (Unauthorized) response. The S-CSCF 124 generates the SIP 401 response including the RAND, the AUTN, the CK, and the IK, and sends the SIP 401 response to the IP device 108 at step 218, In a typical IMS registration and authentication procedure, such as when the requesting device is an IMS terminal that includes an ISIM, the IMS terminal uses a secret key to verify the AUTN with the ISIM. If the verification is successful, the network is authenticated. The IMS terminal then generates a response value (RES), using the secret key and the RAND. The RES is sent to the S-CSCF in the Authorization header field of a new SIP REGISTER request. When the S-CSCF receives the new SIP REGISTER request, it compares the RES to the XRES. If the RES and XRES match, the S-CSCF considers the IMS terminal to be authenticated and returns a SIP 200 (OK) response to the IMS terminal, thereby completing the IMS authentication and registration process for a managed IMS terminal that includes ISIM credentials.

In the systems and methods of the present disclosure, however, the IP device 108 does not include an ISIM and the credentials needed to respond to the security challenge included in the SIP 401 response received from the 5-CSCF 124. Accordingly, at step 220, the IP device 108 generates and sends a request for a RES to the web security gateway 126. The request includes the RAND and the AUTN received in the SIP 401 response. At step 222, the web security gateway 126 forwards the request to the IMS-web security gateway 128. The IMS-web security gateway 128 receives the request and uses the shared secret key to verify the AUTN. The IMS-web security gateway 128 also uses the secret key and the received RAND to generate a RES, which is returned to the web security gateway 126, at step 224. At step 226, the IMS-web security gateway 128 forwards the RES to the IP device 108.

At step 228, the IP device 108 generates a second SIP REGISTER request (authentication request) with the RES included in the Authorization header field, and sends the request to the S-CSCF 124. When the S-CSCF 124 receives the second SIP REGISTER request, it compares the RES to the XRES stored for the requesting device/user. If the RES and XRES match, the S-CSCF 124 considers the IP device 108 to be authenticated and returns a SIP 200 (OK) response to the IP device 108, at step 230, thereby completing the IMS authentication and registration process for the unmanaged IP client device 108.

Figure 3:
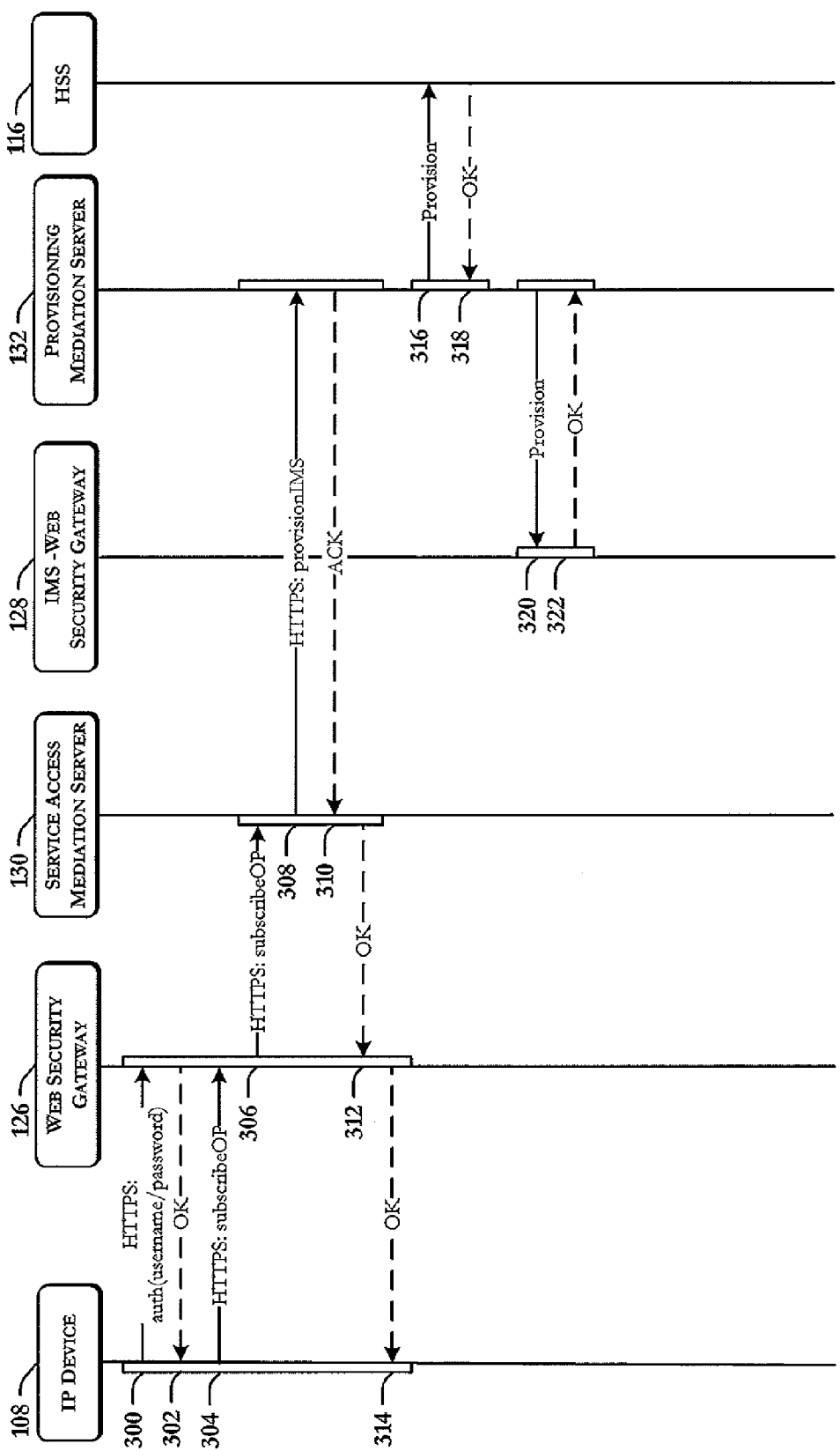
FIG. 3 schematically illustrates a message flow diagram of an exemplary process for provisioning IMS service for an unmanaged IP client device.

Referring now to FIG. 3, a message flow diagram depicting an exemplary IMS service provisioning process is illustrated. The message flow diagram illustrates messages exchanged between the IP device 108, the web security gateway 126, the IMS-web security gateway 128, the service access mediation server 130, the provisioning mediation server 132, and the HSS 116.

Generally, the service access mediation server 130 facilitates provisioning of IMS service for non-IMS devices or unmanaged IP client devices such as the IP devices 108. In some embodiments, the web security gateway 126 receives an IMS service provisioning request directly from an IP device 108, from a point-of-sale (PoS) system (not shown), from a website, or from another source. The IMS service provisioning request is, in some embodiments, an opt-in request. The web security gateway 126 forwards the provisioning request to the service access mediation server 130, which communicates with a provisioning mediation server 132 to provision IMS service for the requesting IP device 108.

The provisioning mediation server 132 provisions the HSS 116 with IMS credentials (e.g., IMPI, IMPU) and a secret key, upon receiving the provisioning request from the service access mediation server 130. The provisioning mediation server 132 also provisions the IMS-web security gateway 128 with this information so that the IMS-web security gateway 128 can authenticate the IP device 108 to the S-CSCF 124 during the registration and authentication process described above with reference to FIG. 2.

In this exemplary provisioning process, the IMS credentials and the secret key are provided to the IMS-web security gateway 128 for use in the registration and authentication process described above with reference to FIG. 2 (i.e., at step 208 of that process). The provisioning process begins at step 300 when pre-authentication credentials, including a username and a password, are sent to the web security gateway 126 using a web protocol, such as HTTP, HTTPS, or S-HTTPS. The web security gateway 126 receives the pre-authentication credentials from the IP device 108 and performs a look-up process to access the user's record and to authenticate the user. If the pre-authentication credentials do not match the stored record, the web security gateway 126 may prompt the user to reenter the credentials, prevent further credential entries until a predetermined time period has elapsed, prompt the user to call a customer service number or visit a customer service website for further assistance, or the like. Else, if the authentication credentials match the stored record, the web security gateway 126 notifies the IP device 108 of successful authentication. In the illustrated example, the web security gateway 126 sends an OK message to the IP device 108 at step 302.

At step 304, the IP device 108 sends an IMS provisioning request to request that the IP device 108 be provisioned for IMS service. The web security gateway 126 forwards the request to the service access mediation server 130 at step 306. At step 308, the service access mediation server 130 sends an IMS provisioning request to the provisioning mediation server 132. The provisioning mediation server 132 responds, at step 310, with an acknowledge message directed to the service access mediation server 130. At step 312, the service access mediation server 130 notifies the web security gateway 126 that the provisioning request has been received with an OK message, which is forwarded, at step 314, by the web security gateway 126 to the IP device 108.

At step 316, the provisioning mediation server 132 provisions the HSS 116 with IMS credentials and a secret key. The HSS 116 updates the subscriber's service profile to include IMS service and stores the IMS credentials and the secret key in association with the subscriber's service profile. At step 318, the HSS 116 responds to the provisioning mediation server 132 with an OK message.

At step 320, the provisioning mediation server 132 provisions the IMS-web security gateway 128 with the IMS credentials and the secret key. The IMS-web security gateway 128 stores the IMS credentials and the secret key and reports success of the provisioning procedure to the provisioning mediation server 132 with an OK message, at step 322. The IMS-web security gateway 128 now has the IMS credentials and the secret key needed for responding to the registration request and the authentication request, respectively, during the registration and authentication process described above with reference to FIG. 2.

In some embodiments, the provisioning mediation server 132 is also configured to provide a $SQN_{HSS}$ to the HSS 116 and a $SQN_{MS}$ to the IMS-web security gateway 128, respectively, during the provisioning process. In other embodiments, the HSS 116 and the IMS-web security gateway 128 are configured to initialize the sequence numbers upon being provisioned with the IMS credentials and the secret key and maintain the sequence numbers when handling authentication processes, such as the authentication process described above with reference to FIG. 2.

In an alternative embodiment, the IMS-web security gateway 128 requests the IMS credentials and the secret key from the HSS 116 each time a request for such information is received at the IMS-web security gateway 128. For example, in this embodiment, FIG. 2 is modified to include two additional queries, one between steps 206 and 208 and another between steps 222 and 224. The RES is still calculated by the IMS-web security gateway 128.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A method for registering and authenticating an internet protocol device with an internet protocol multimedia subsystem, the method comprising:

a web security gateway receiving a request for internet protocol multimedia subsystem credentials from the internet protocol device, wherein the internet protocol device lacks the internet protocol multimedia subsystem credentials, including a public user identity and a private user identity, and a secret key, needed for registration and authentication with the internet protocol multimedia subsystem;

the web security gateway retrieving the requested internet protocol multimedia subsystem credentials, including the public user identity, the private user identity, and the secret key, from an internet protocol multimedia subsystem-web security gateway and forwarding the requested internet protocol multimedia subsystem credentials to the internet protocol device, wherein a call session control function of the internet protocol multimedia subsystem receives a registration request from the internet protocol device, the registration request comprising the internet protocol multimedia subsystem credentials received by the internet protocol device from the web security gateway, the call session control function retrieves a security challenge from a home subscriber server using the internet protocol multimedia subsystem credentials received in the registration request, and the call session control function sends the security challenge to the internet protocol device;

the web security gateway receiving a request for a security challenge response from the internet protocol device; and the web security gateway retrieving the security challenge response from the internet protocol multimedia subsystem-web security gateway and forwarding the security challenge response to the internet protocol device, wherein the call session control function receives an authentication request from the internet protocol device, the authentication request comprising the security challenge response received by the internet protocol device from the web security gateway, and the call session control function authenticates the internet protocol device to access internet protocol multimedia subsystem services provided through the internet protocol multimedia subsystem.

2. The method of claim 1, wherein the web security gateway retrieving the requested internet protocol multimedia subsystem credentials from the internet protocol multimedia subsystem-web security gateway and forwarding the requested internet protocol multimedia subsystem credentials to the internet protocol device comprises the web security gateway retrieving an internet protocol multimedia subsystem public user identity and an internet protocol multimedia subsystem private user identity from the internet protocol multimedia subsystem-web security gateway and forwarding the internet protocol multimedia subsystem public user identity and the internet protocol multimedia subsystem private user identity to the internet protocol device.

3. The method of claim 1, wherein the call session control function receives a first session initiation protocol register request comprising the internet protocol multimedia subsystem credentials.

4. The method of claim 3, wherein the call session control function receives a second session initiation protocol register request comprising the security challenge response.

5. The method of claim 1, wherein the internet protocol multimedia subsystem-web security gateway generates the security challenge response using the secret key received during an internet protocol multimedia subsystem service provisioning process and sends the security challenge response to the web security gateway upon request from the web security gateway.

6. The method of claim 1, further comprising the web security gateway receiving pre-authentication credentials from the internet protocol device, the pre-authentication credentials being used by the web security gateway to pre-authenticate the internet protocol device to retrieve the internet protocol multimedia subsystem credentials and the security challenge response from the internet protocol multimedia subsystem-web security gateway by way of the web security gateway.

7. The method of claim 6, wherein the web security gateway receiving the pre-authentication credentials from the internet protocol device comprises the web security gateway receiving a username and a password from the internet protocol device, prior to receiving the request for the internet protocol multimedia subsystem credentials from the internet protocol device, and the method further comprises the web security gateway comparing the received username and the password to a record associated with the internet protocol device stored in an authentication database of the web security gateway to determine whether the internet protocol device is pre-authenticated to receive the internet protocol multimedia subsystem credentials.

8. A system for registering and authenticating an internet protocol device with an internet protocol multimedia subsystem, the system comprising:

a web security gateway in communication with the internet protocol device, the web security gateway being configured to:

receive a request for internet protocol multimedia subsystem credentials from the internet protocol device, wherein the internet protocol device lacks internet protocol multimedia subsystem credentials, including a public user identity and a private user identity, and a secret key, needed for registration and authentication with the internet protocol multimedia subsystem;

retrieve the requested internet protocol multimedia subsystem credentials, including the public user identity, the private user identity, and the secret key, from an internet protocol multimedia subsystem-web security gateway;

send the requested internet protocol multimedia subsystem credentials to the internet protocol device, wherein a call session control function of the internet protocol multimedia subsystem receives a registration request from the internet protocol device, the registration request comprising the internet protocol multimedia subsystem credentials received by the internet protocol device from the web security gateway, the call session control function retrieves a security challenge from a home subscriber server using the internet protocol multimedia subsystem credentials received in the registration request, and the call session control function sends the security challenge to the internet protocol device;

receive a request for a security challenge response from the internet protocol device;

retrieve the requested security challenge response from the internet protocol multimedia subsystem-web security gateway; and send the requested security challenge response to the internet protocol device, wherein the call session control function receives an authentication request from the internet protocol device, the authentication request comprising the security challenge response received by the internet protocol device from the web security gateway, and the call session control function authenticates the internet protocol device to access internet protocol multimedia subsystem services provided through the internet protocol multimedia subsystem.

9. The system of claim 8, wherein the system further comprises a provisioning mediation server that is configured to perform a provisioning process to provision the internet protocol multimedia subsystem-web security gateway with the internet protocol multimedia subsystem credentials and the secret key, the secret key being used in combination with a random challenge received in the request for the security challenge response to generate the security challenge response.

10. The system of claim 8, wherein the system further comprises a home subscriber server, and the internet protocol multimedia subsystem-web security gateway is configured to retrieve the internet protocol multimedia subsystem credentials from the home subscriber server each time the internet protocol multimedia subsystem credentials are requested and retrieve the secret key from the home subscriber server each time the security challenge response is requested, the secret key being used by the internet protocol multimedia subsystem-web security gateway in combination with a random challenge to generate the security challenge response.

11. The system of clam 8, wherein the web security gateway retrieves the requested internet protocol multimedia subsystem credentials by retrieving an internet protocol multimedia subsystem public user identity and an internet protocol multimedia subsystem private user identify from the internet protocol multimedia subsystem-web security gateway and the requested security challenge response from a database within the gateway.

12. The system of claim 8, wherein the internet protocol device is not configured with an internet protocol-multimedia services identity module or a universal subscriber identity module for registering and authenticating with the internet protocol multimedia subsystem.

13. The system of claim 12, wherein the internet protocol device is a device selected from a group comprising a computer, a hand-held computing device, a gaming device, a global positioning system unit, and a mobile device.

14. The system of claim 8, wherein the web security gateway is configured to receive pre-authentication credentials from the internet protocol device, the pre-authentication credentials being used by the web security gateway to pre-authenticate the internet protocol device to retrieve the internet protocol multimedia credentials and the security challenge response from the internet protocol multimedia subsystem-web security gateway by way of the web security gateway.

15. The system of claim 14, wherein the web security gateway is configured to receive the pre-authentication credentials from the internet protocol device by receiving a username and a password from the internet protocol device, prior to receiving the request for the internet protocol multimedia subsystem credentials from the internet protocol device, and the web security gateway is configured to compare the received username and the password to a record associated with the internet protocol device stored in an authentication database of the web security gateway to determine whether the internet protocol device is pre-authenticated to receive the internet protocol multimedia subsystem credentials.

\* \* \* \* \*